United States Patent
Nogueiras et al.

(10) Patent No.: US 7,590,434 B2
(45) Date of Patent: Sep. 15, 2009

(54) SEAL FOR PORTABLE ELECTRONIC DEVICE HOUSING WITH FLEX CIRCUIT

(75) Inventors: Eduardo Nogueiras, Miramar, FL (US); David I. Blatt, Margate, FL (US); Bach L. Nguyen, Lauderhill, FL (US)

(73) Assignee: Motorola, Inc., Schaumburg, IL (US)

( * ) Notice: Subject to any disclaimer, the term of this patent is extended or adjusted under 35 U.S.C. 154(b) by 490 days.

(21) Appl. No.: 11/424,465

(22) Filed: Jun. 15, 2006

(65) Prior Publication Data

US 2007/0293281 A1 Dec. 20, 2007

(51) Int. Cl.
*H04M 1/00* (2006.01)
*H01R 12/00* (2006.01)
*H05K 1/00* (2006.01)

(52) U.S. Cl. .................... 455/575.1; 439/65
(58) Field of Classification Search .............. 455/575.1; 439/65

See application file for complete search history.

(56) References Cited

U.S. PATENT DOCUMENTS

| | | |
|---|---|---|
| 4,090,800 A | 5/1978 | Koch |
| 4,714,439 A | 12/1987 | Marabotto et al. |
| 5,419,606 A | 5/1995 | Hull et al. |
| 5,461,834 A | 10/1995 | Carlberg |
| 5,599,429 A | 2/1997 | Martin et al. |
| 5,873,357 A | 2/1999 | Lake |
| 6,135,782 A * | 10/2000 | Cox et al. ...................... 439/65 |
| 6,310,747 B1 * | 10/2001 | Emo et al. ................. 360/97.02 |
| 6,693,579 B2 * | 2/2004 | Baxter et al. ................... 342/29 |
| 2007/0293281 A1 * | 12/2007 | Nogueiras et al. ......... 455/575.1 |

FOREIGN PATENT DOCUMENTS

EP          0942303 B1      12/2005

* cited by examiner

*Primary Examiner*—William D Cumming
(74) *Attorney, Agent, or Firm*—Akerman Senterfitt Pablo Meles (57) ABSTRACT

A portable electronic device includes a portable electronic device housing (110) where the housing has at least one orifice (120) to an internal portion (130) of the housing. The electronic device also includes a flex circuit (140) projecting from the orifice, a seal (150) located at the orifice to prevent liquid from entering the internal portion of the housing, where the seal has a first portion (150*a*) and a second portion (150*b*). The first portion and the second portion of the seal sandwich the flex circuit and the seal is snug fit in the orifice. A method (300) of installing a seal for a portable electronic device housing having an orifice through which a flex circuit protrudes is also provided.

18 Claims, 7 Drawing Sheets

SEAL FOR PORTABLE ELECTRONIC DEVICE HOUSING WITH FLEX CIRCUIT

CROSS REFERENCE TO RELATED APPLICATIONS

Not Applicable.

FIELD OF THE INVENTION

This invention relates to the field of mobile electronic devices, and more particularly, to an apparatus for sealing around a flex connecting portions of a mobile electronic device.

BACKGROUND

In recent years, mobile electronic products have become increasingly popular. The mobile telephone is one type of mobile electronic product that has become nearly ubiquitous in today's society. Such mobile electronic devices are routinely carried on the person of the owner at all times. Although such constant availability of such devices provides a benefit to the user, such constant use of such devices exposes these devices to changes in weather conditions and inadvertent exposure to various substances. For instance, a mobile telephone may be exposed to liquid water during a rain storm or by inadvertent spilling of a liquid. Such exposure can cause an electronic mobile telephone to malfunction, or in other instances, cause an electronic mobile telephone to completely cease working.

Some prior art has inadequately attempted to address the concern of exposure to liquids for electronic devices. For instance, EP1622280 provides a mobile telephone case where the entire telephone is placed in an internal cavity of a sealable case. Of course, the mobile telephone would need to be removed during use, and thus, no protection would be provided during use. JP2004016360 provides a similar waterproof case for a mobile telephone. Again, the entire telephone must be inserted into the case, which would greatly increases the overall bulk of components that a user must carry on his or her person. Still further, during use, the case would need to be opened to access the telephone. Thus, the case would not prevent liquid exposure during use.

In contrast to placing an entire electronic device in a waterproof container, some prior art examples have attempted to seal various portions of electronic devices. For instance, U.S. Pat. No. 4,714,439 is directed to an electrical connector with an annular seal. As shown in FIG. 1 of U.S. Pat. No. 4,714,439, the seal is sized to seal around the periphery of the cylindrical components that are affixed in a compact and static configuration.

Nevertheless, such an annular seal around the periphery of static cylindrical components is not suitable for sealing electronic devices that include movable components and/or components that are not cylindrical. One example of such a device is a telephone with a clam-shaped housing having a connection between the two portions of the telephone housing. In order to prevent liquids from entering such a telephone, the entry point on each half of the telephone that accepts the structure that connects the two halves of the telephone housing must be sealed. The sealing of such an entry point is further complicated by the flexible characteristics and generally flattened or rectangular shape of the structure that connects the two halves of the telephone. An annular seal does not suffice for a sealing a generally flattened or rectangular shaped structure. Furthermore, with the ever decreasing size of components for electronic devices, the small size of annular seal would make it quite difficult to visually determine if the seal was properly installed.

The marketplace lacks a solution to seal a portable electronic device having movable components, such as a mobile telephone, without resorting to placing the entire portable electronic device within a separate case. Furthermore, no solution previously presented for sealing components in electronic devices is adaptable for providing a seal for electronic devices having a housing of two or more portions where the seal provides a visual indicator that the seal is properly installed.

SUMMARY OF THE INVENTION

Embodiments in accordance with the present invention provide a portable electronic device carrier that offers the option of selectively altering the state of the electronic device when removing the device from the carrier. The invention also provides for the option of not altering the state of the electronic device when removing the device from the carrier. Therefore, the carrier provides the user with a greater control and ease of use of the electronic device.

In accordance with the inventive arrangements, a portable electronic device is provided and can include a portable electronic device housing where the housing has one or more orifices to an internal portion of the housing and a flex circuit projecting from the one or more orifices. A seal is provided and located at the one or more orifices to prevent liquid from entering the internal portion of the housing. The seal has a first portion and a second portion where the first portion and the second portion of the seal sandwich the flex circuit and the seal is snug fit in the orifice. Additionally, the first portion of the seal can have a first flex sealing surface and the second portion of the seal can have a second flex sealing surface. The first flex sealing surface can have structure that engages corresponding structure of the second flex sealing surface. The structure of the first flex sealing surface can be a projection and the structure of the second flex sealing surface can be a recess, and in such an arrangement, the projection can insert in the recess. Still further, the flex circuit can include an aperture through which the projection extends to insert in the recess. Additionally, adhesive can be located between the seal and the flex circuit.

In one embodiment, the seal includes an alignment projection orientated to indicate that the first portion and the second portion are flush with the flex circuit. Further, the first portion and the second portion of the seal can include one or more portions of a collar through which a fastening member can be inserted to fasten the first portion and the second portion of the seal to the housing. Additionally, the first portion and the second portion of the seal can provide an insertion member orientated for insertion into the housing orifice and the insertion member can have a beveled edge. Still further, the beveled edge can include a raised ledge. A cover can also be coupled to the housing to compresses the seal against the flex circuit.

Also in accordance with the inventive arrangements, a seal for a portable electronic device housing having an orifice through which a flex circuit protrudes is provided. The seal can include a first portion with a first flex sealing surface and a second portion with a second flex sealing surface. Additionally, the first flex sealing surface can have structure that engages corresponding structure of the second flex sealing surface where the first portion and the second portion engage each other with the flex circuit sandwiched therebetween. The structure of the first flex sealing surface can include a projection and the structure of the second flex sealing surface can include a recess, and the projection can insert in the recess. An adhesive can be located between the seal and the flex circuit.

In one arrangement, the seal can include an alignment projection orientated to indicate that the first portion and the second portion are flush with the flex circuit. Additionally, first portion and the second portion of the seal can include one or more portions of a collar through which a fastening member inserts to fasten the first the first portion and the second portion of the seal to the housing. Additionally, the first portion and the second portion of the seal can provide a insertion member orientated for insertion into a housing orifice and the insertion member can have a beveled edge. Additionally, the beveled edge can include a raised ledge. Additionally, the first portion and the second portion are flexible.

A method of installing a seal for a portable electronic device housing having an orifice through which a flex circuit protrudes is also provided in accordance with the inventive arrangements. The method can include the steps of providing a portable electronic device housing having an orifice through which a flex circuit protrudes, providing a seal having a first portion with a first flex sealing surface, a second portion with a second flex sealing surface, the first flex sealing surface having structure that engages corresponding structure of the second flex sealing surface and providing an adhesive on at least one of the first flex sealing surface or the second flex sealing surface. The method can also include the steps of placing the first flex sealing surface flush with the flex circuit and placing the second flex sealing surface opposite the first flex sealing surface and flush with the flex circuit such that the first flex sealing surface structure engages the structure of the second flex sealing surface and sandwiches the flex circuit therebetween.

In one arrangement, the method can also include the steps of orientating an alignment projection of at least the first portion or the second portion to ensure that that the first flex sealing surface and the second flush sealing surface are flush with the flex circuit, fastening the first portion and the second portion of the seal to the housing by inserting a fastener through a projection of at least the first portion or the second portion forming at least a portion of a collar and coupling a cover to the housing, wherein the cover compresses the first portion and the second portion of the seal against the flex circuit.

The above features and advantages of the present invention will be better understood with reference to the following figures and detailed description. It should be appreciated that the particular devices and methods illustrating the present invention are exemplary only and not to be regarded as limitations of the present invention.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). As used in this application, the term "sandwich" refers to an arrangement of structure where one component is tightly located between two structures, such that there are no open spaces between the component and the two structures where water and/or gases could pass. As used in this application, the phrase "snug fit" refers to an arrangement of structure where one or more components are compressed together by insertion of the components in a surrounding structure to result in such a close fit that there are no open spaces between the components and the surrounding structure where water and/or gases could pass.

The present invention provides a solution to the limitations of the prior art, which required users to place electronic devices in separate containers in order to protect the electronic devices from exposure to liquids and/or gases, such as water vapor. The present invention provides a seal to prevent liquids and/or gases from inadvertently entering the internal housing of the electronic device. Still further, the seal can be used with movable components of electronic devices, such as sealing the openings on two halves of a mobile telephone housing where a flex circuit enters and/or exits the internal housing of each half of the mobile telephone housing.

By reference to the exemplary drawings in detail wherein like numerals indicate like elements throughout the various views, there is shown in FIGS. 1 through 5 an exemplary electronic device 100 with a seal in accordance with the invention. The electronic device 100 can include a housing 110 with orifice 120, which leads to an internal portion 130 of housing 110. The electronic device 100 can also include a movable flex circuit 140 and seal 150, including first seal portion 150a and second seal portion 150b.

Figure 1:
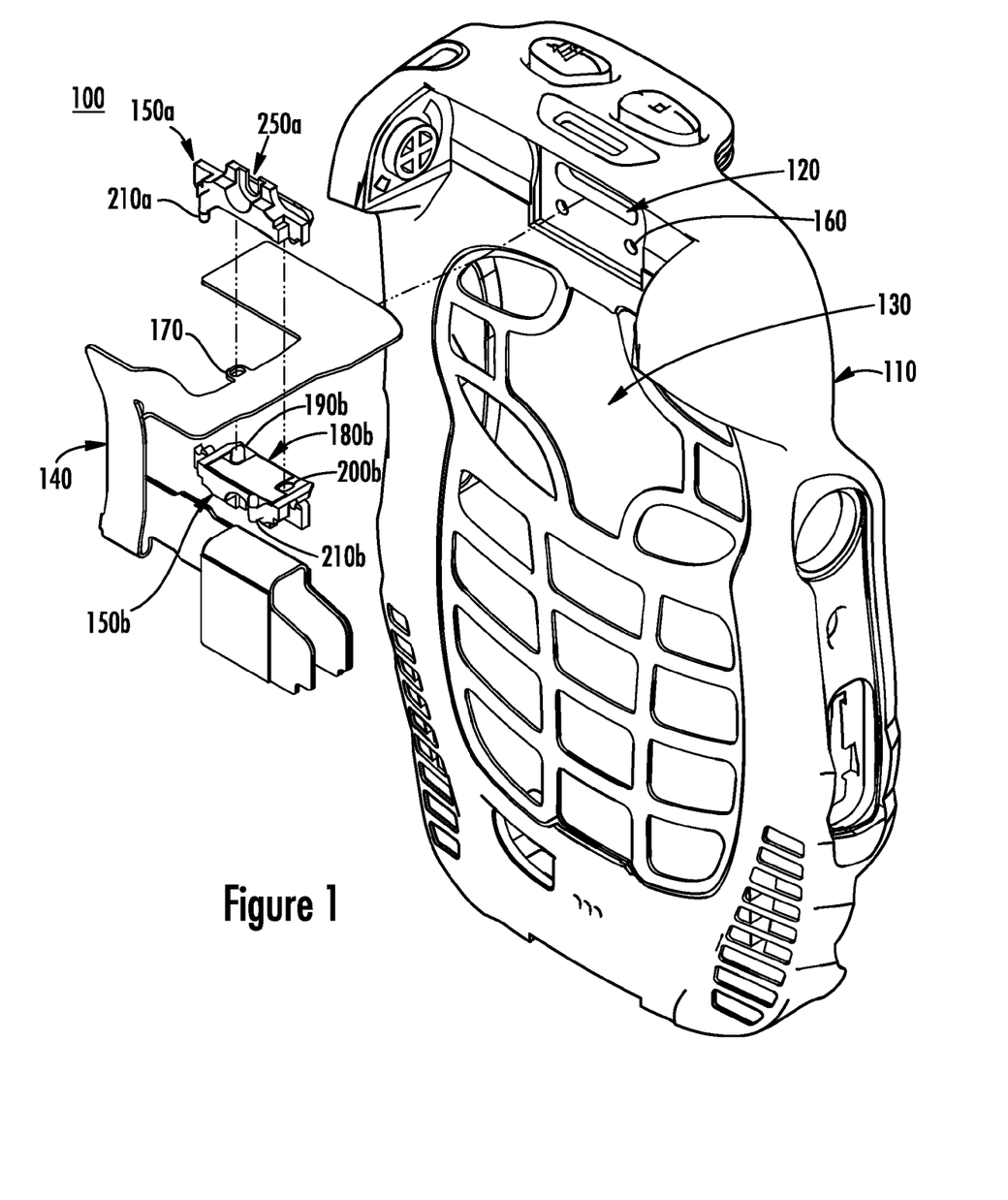
FIG. 1 is a perspective view of one embodiment of a portable electronic device with a seal in accordance with an embodiment of the inventive arrangements.

The housing 110 can include the orifice 120, threaded or unthreaded cavities 160 for accepting screws or other securing structures, and other components or structures as desired. The orifice 120 provides an opening to the internal portion 130 of housing 110, and thus, creates an entry point where liquids and/or gases could potentially enter the internal portion 130 of housing 110. As one skilled in the art would understand, the majority of the electrical components and circuitry (not shown) of the electronic device 100 are located within the internal portion 130 of housing 110 for various reasons, including shielding these components and circuitry from exposure to liquids and/or gases. The housing 110 can be constructed of any suitable material, such as plastic, metal, rubber and the like. Also, it should be noted that the housing 110 is illustrated as a housing for mobile telephone; however, the invention is not limited in this regard.

Figure 4A:
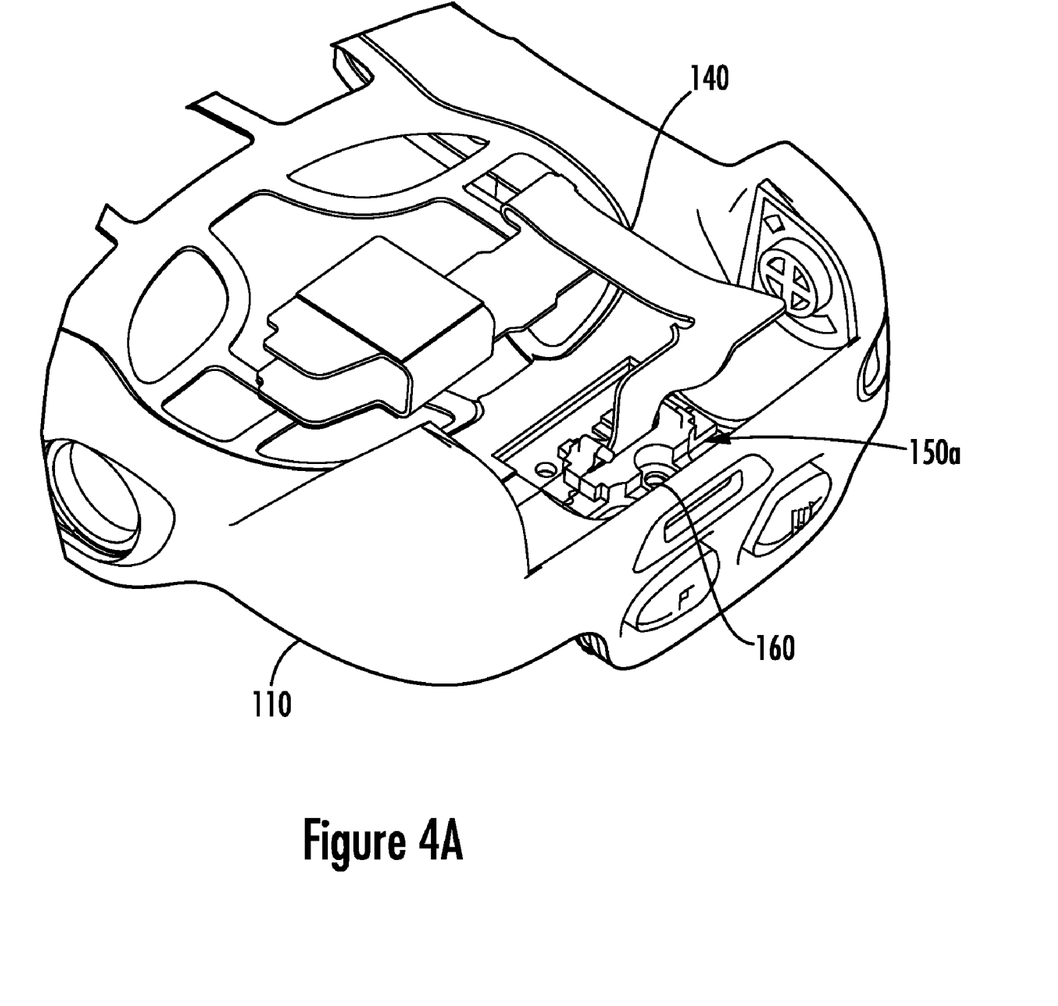
FIG. 4A is another perspective view of a portion of the portable electronic device of FIG. 1 in accordance with an embodiment of the inventive arrangements.
Figure 4B:
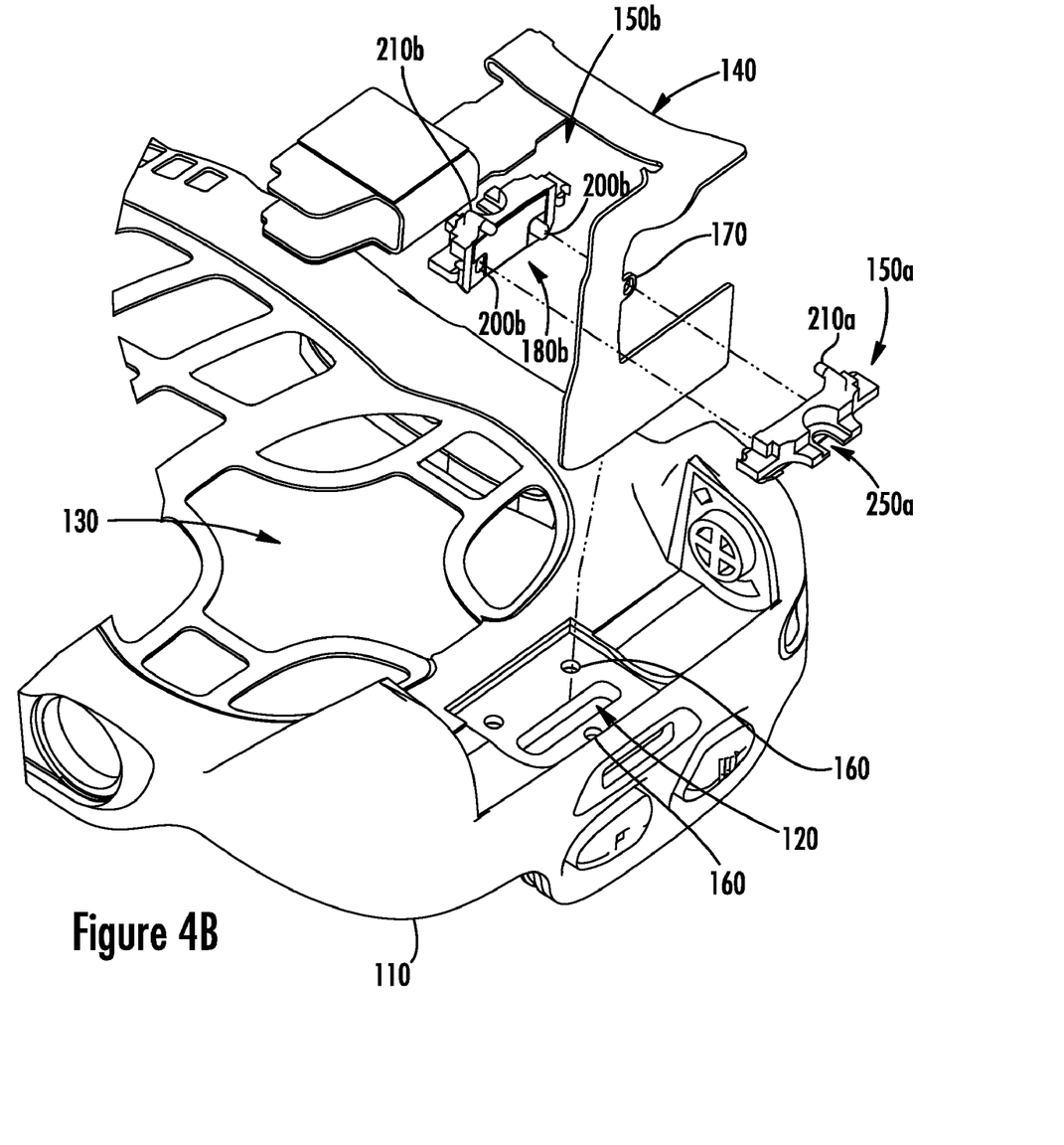
FIG. 4B is yet another perspective view of a portion of the portable electronic device of FIG. 1 in accordance with an embodiment of the inventive arrangements.

The flex circuit 140 is a bendable circuit that can move, flex and/or bend as needed without disconnecting electrical connections and can be constructed of polyester, polyimide or any other suitable material. Once the electronic device 100 is constructed, a portion of the flex circuit 140 can be located within the internal portion 130 of housing 110 and can be connected to the electrical components and/or circuitry therein as needed. The flex circuit 140 can project from the internal portion 130 of housing 110 through orifice 120 as shown in FIGS. 4A and 4B. The flex circuit 140 can include one or more engagement structures, such as aperture 170, to be engaged by the seal 150. Such engagement ensures proper arrangement and alignment of the seal 150 with the flex circuit 140 such that the seal 150 prevents liquids and/or gases from entering the internal portion 130 of housing 110.

The portion of the flex circuit 140 that projects from orifice 120 is constructed and arranged to be inserted into another portion of a housing (not shown) to couple the electrical components and/or circuitry located within the internal portion 130 of housing 110 to the electrical components and/or circuitry located within the internal portion of the second portion of the housing. For example, a housing of a clam-shell arranged mobile telephone includes two housing halves, with the electrical components and/or circuitry of each connected via a flex circuit, such as flex circuit 140.

Figure 2A:
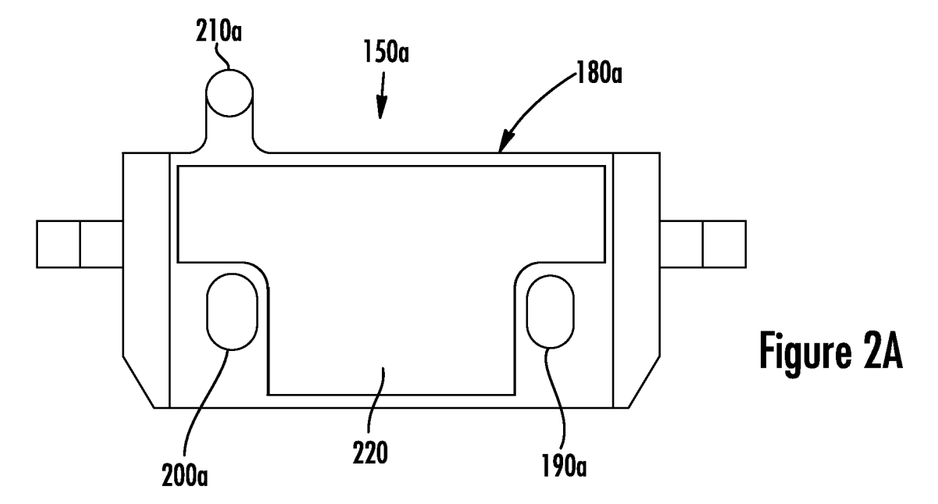
FIG. 2A is a plan view of the seal of FIG. 1 in accordance with an embodiment of the inventive arrangements.
Figure 2B:
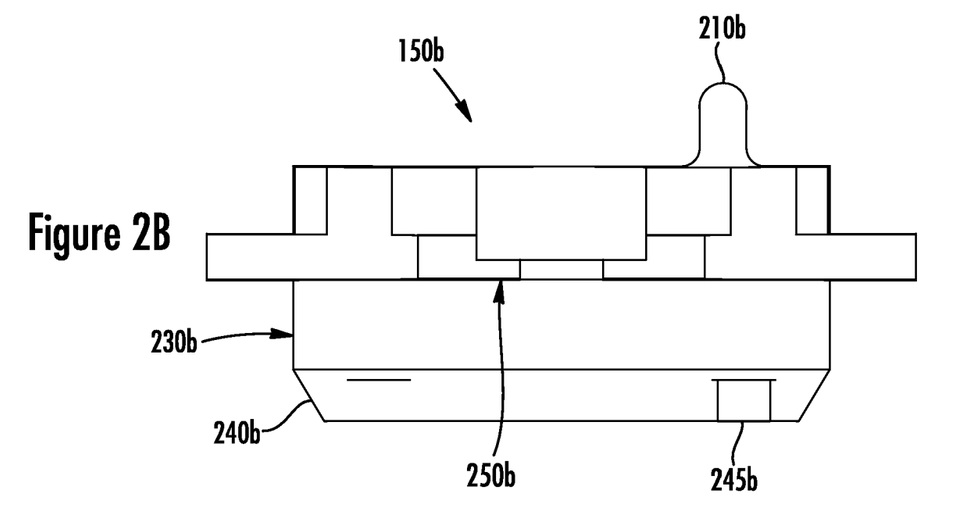
FIG. 2B is a plan view of the seal of FIG. 1 in accordance with an embodiment of the inventive arrangements.

The seal 150 includes seal portion 150a and seal portion 150b. The seal portion 150a includes a flex sealing surface 180a, projection 190a, recess 200a and alignment projection 210a. Similarly, the seal portion 150b includes a flex sealing surface 180b, projection 190b, recess 200b and alignment projection 210b. The seal 150 can be constructed of any elastic material, such as silicone or any other suitable material, that allows for compression of the seal 150 so that seal 150 has a snug fit with the flex circuit 140 and the housing 110.

The flex sealing surfaces 180a and 180b can provide a generally flat surface for laying flush against the flat surface of flex circuit 140 such that there is no appreciable space between the flex circuit 140 and the flex sealing surfaces 180a and 180b where liquids and gases could travel to the internal portion 130 of housing 110. Additionally, an adhesive 220, such as an adhesive tape or liquid adhesive, can be placed on one or both of the flex sealing surfaces 180a and 180b. Also, the flex sealing surface 180a and 180b can be sized to be slightly larger than the width of the flex circuit 140 and adhesive 220 can bond to the periphery of the flex circuit 140 where the adhesive 220 can also simultaneously bond to the flex sealing surfaces 180a and 180b. With the adhesive 220 completely surrounding the flex circuit 140, the adhesive 220 can fill any gaps between the between the flex circuit 140 and the flex sealing surfaces 180a and 180b and also any gaps between the flex sealing surfaces 180a and 180b.

The flex sealing surface 180a can include structures for engaging, and/or being engaged by, structure provided by flex sealing surface 180b. For instance, flex sealing surface 180a includes projection 190a and recess 200a, and similarly, the flex sealing surface 180b includes corresponding projection 190b and recess 200b. When the seal 150 is assembled, the projection 190a inserts into recess 200b and the projection 190b inserts into recess 200a to ensure a flush fit of the flex sealing surface 180a and the flex sealing surface 180b at the periphery of the flex circuit 140. Adhesive 220 can also be provided on the respective projections 190a and 190b and recesses 200a and 200b to ensure that the flex sealing surfaces 180a and 180b do not separate. In this arrangement, the seal portions 150a and 150b are on both sides of the flex circuit 140 and sandwich the flex circuit 140 therebetween. Additionally, the projection 190a can be inserted through the aperture 170 of the flex circuit 140 to further ensure that the flex sealing surface 180a and the flex sealing surface 180b are flush with the flex circuit 140 and with each other.

The alignment projections 210a and 210b provide both a structure that can be grasped to manipulate the orientation of the seal portions 150a and 150b during installation and provide a visual indicator of whether the seal portions 150a and 150b are properly arranged together to sandwich the flex circuit 140. As illustrated best in FIG. 3, the alignment projections 210a and 210b are arranged to be substantially perpendicular to the flex sealing surfaces 180a and 180b when the flex sealing surfaces 180a and 180b are flush with each other and when flush with the flex circuit 140. Still further, the alignment projections 210a and 210b are also arranged to be substantially parallel with each other when the flex sealing surfaces 180a and 180b are flush with each other and when flush with the flex circuit 140. If one or both of the seal portions 150a and 150b are improperly installed, either of the alignment projections 210a or 210b will not be substantially perpendicular to the flex sealing surfaces 180a and 180b and the alignment projections 210a and 210b will not be arranged substantially parallel with each other. Thus, the alignment projections 210a and 210b provide a visual indicator of proper or improper installation and arrangement of the seal portions 150a and 150b.

Figure 3:
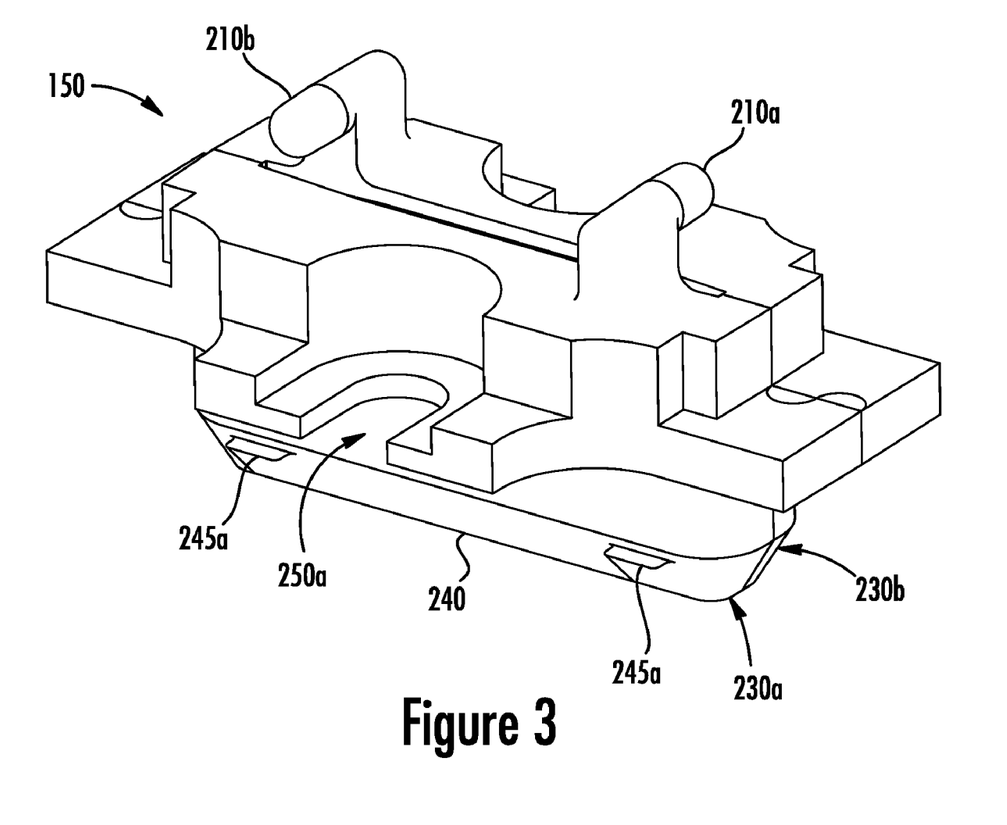
FIG. 3 is a perspective view of the seal of FIG. 1 in accordance with an embodiment of the inventive arrangements.

Still further, the seal portions 150a and 150b provide insertion members 230a and 230b orientated for insertion into the housing orifice 120. The insertion members 230a and 230b can be sized such that once inserted in the orifice 120, the insertion members 230a and 230b are compressed to have a snug fit. The compression of the insertion members 230a and 230b further sandwiches the seal portions 150a and 150b around the flex circuit 140 and further ensures that liquid and/or gases cannot enter the internal portion 130 of housing 110.

The insertion members 230a and 230b also have beveled edges 240a and 240b that aid insertion by being slightly smaller than the size of the orifice 120; nevertheless, the beveled edges 240a and 240b include raised edges 245a and 245b (not shown), which sit against the housing 110 adjacent to the orifice 120 when the seal portions 150a and 150b are installed. The raised edges 245a and 245b prevent the insertion members 230a and 230b from being inadvertently removed from the orifice 120 of the housing 110. Further, it should be noted that the flex sealing surfaces 180a and 180b can span the length of the seal portions 150a and 150b, including a portion of the insertion members 230a and 230b, to provide an elongated surface that is flush with flex circuit 140.

Additionally, the seal portions 150a and 150b provide at least a portion of collars 250a and 250b. A fastening member, such as a screw, can be inserted through collar 250a to secure the sandwiched seal portions 150a and 150b to the housing 110. Although not necessary to retain the seal portions 150a and 150b within orifice 120, including a fastening member can provide further stability to the seal 150, can ensure that the seal 150 does not become misaligned during use, and can prevent the seal portions 150a and 150b from dislodging from the orifice 120.

Figure 5:
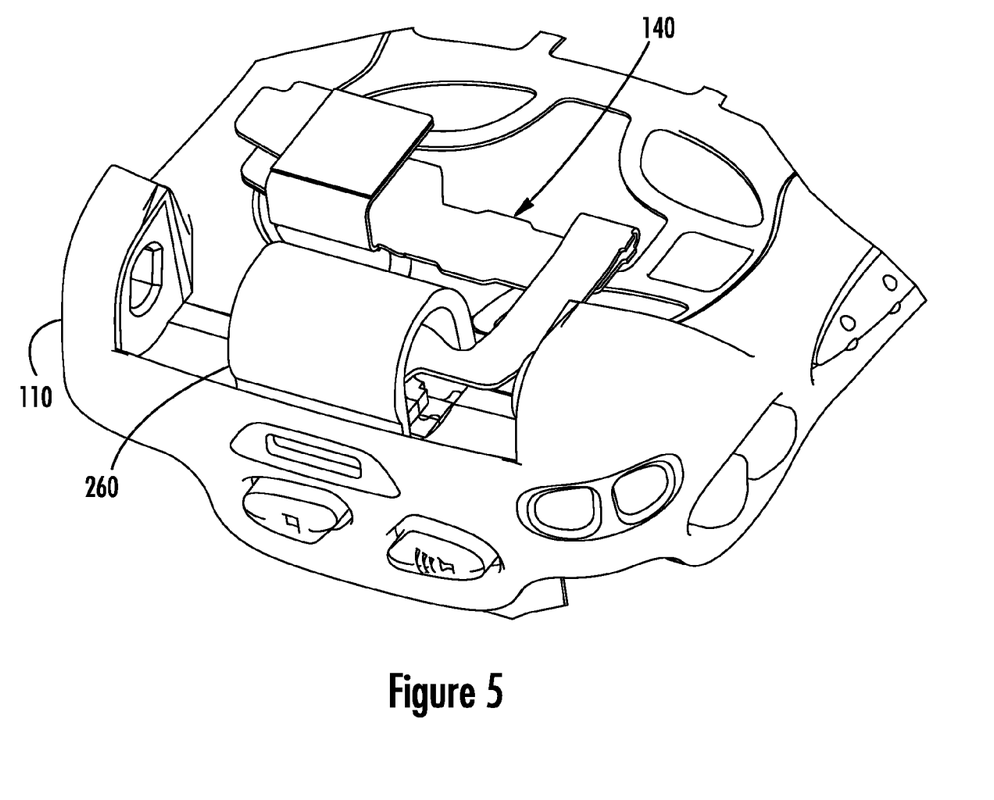
FIG. 5 is still another perspective view of a portion of the portable electronic device of FIG. 1 in accordance with an embodiment of the inventive arrangements.

Referring to FIG. 5, a cover 260 can also be provided to be coupled to the housing 110 over the seal 150. The cover 260 can further compress the seal 150 to ensure that the flex circuit 140 is sandwiched between the seal portions 150a and 150b and to ensure that the seal portions 150a and 150b do not dislodge from the orifice 120.

The present invention also provides a method 300 of installing a seal for a portable electronic device housing having an orifice through which a flex circuit protrudes. The steps of the method are illustrated in a flow chart shown as FIG. 6. Although the flow chart illustrates the steps of method 300 in sequential order, there is no requirement as to the order of the steps, whether some steps are completed or skipped, or whether additional steps can be added.

Figure 6:
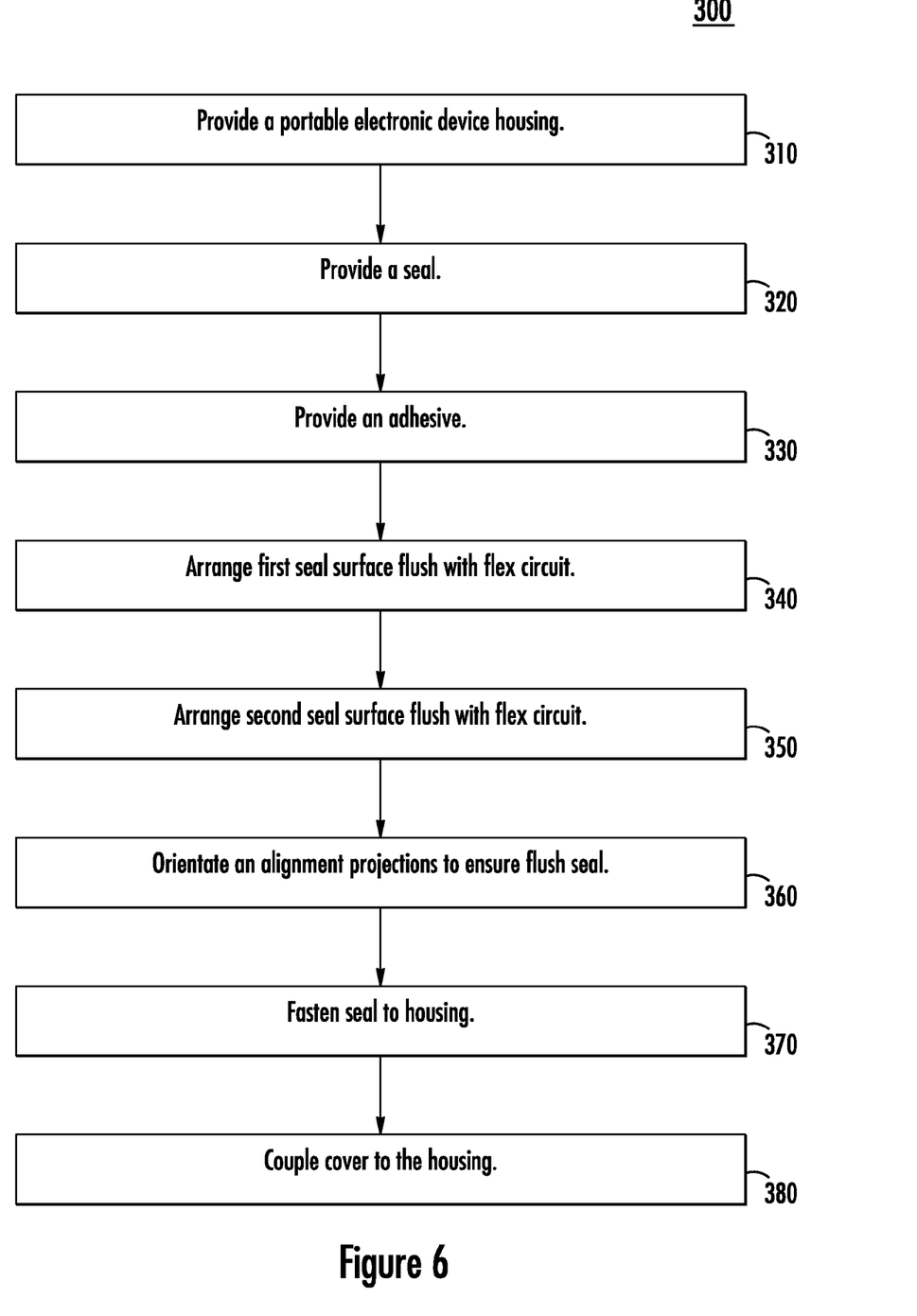
FIG. 6 is a flow chart of a method in accordance with an embodiment of the inventive arrangements.

In step 310, a portable electronic device housing having an orifice through which a flex circuit protrudes is provided. As discussed herein, a clam-shaped mobile telephone is one example of such a portable electronic device housing. The invention is not limited in this regard as other portable electronic device housings are suitable.

In step 320, a seal is provided. The seal can include a first portion with a first flex sealing surface, a second portion with a second flex sealing surface. The first flex sealing surface can also have structure that engages corresponding structure of the second flex sealing surface.

In step 330, an adhesive can be provided on one or more of the first flex sealing surface and the second flex sealing surface. In this step, enough adhesive can be provided such that when the seal sandwiches the flex circuit, the adhesive can file any gaps between the seal and the flex circuit and the seal and the housing.

In step 340, the first flex sealing surface can be arranged to be flush with the flex circuit. Moving on to step 350, the second flex sealing surface can be arranged to be opposite to the first flex sealing surface and flush with the flex circuit. In such an arrangement, the first flex sealing surface structure engages the structure of the second flex sealing surface and sandwiches the flex circuit therebetween.

Nevertheless, before the arrangement of the seal is finalized, the alignment projections can be orientated to ensure that that the first flex sealing surface and the second flush sealing surface are flush with the flex circuit in step 360. To verify a flush seal, the alignment projections can be substantially perpendicular with opposite flex sealing services and parallel with each other.

Although not necessary, in step 370, the first portion and the second portion of the seal can be fastened to the housing by inserting a fastener through a collar of the first and/or second seal portion. Still further, in step 380 a cover can be coupled to the housing such that the cover compresses the first portion and the second portion of the seal against the flex circuit. The cover can also compress the first portion and the second portion to the housing.

This invention can be embodied in other forms without departing from the spirit or essential attributes thereof. For instance, although the electronic device is shown as a mobile phone, one skilled in the art would readily recognize that the invention can be used with a wide variety of electronic devices, such as radios, personal digital assistants, micro computers, and the like. Accordingly, reference should be made to the following claims, rather than to the foregoing specification, as indicating the scope of the invention.

We claim:

1. A portable electronic device, comprising:
a portable electronic device housing, the housing having at least one orifice to an internal portion of the housing;
a flex circuit projecting from the orifice;
a seal located at the orifice to prevent liquid from entering the internal portion of the housing, the seal having a first portion and a second portion;
wherein the first portion and the second portion of the seal sandwich the flex circuit and the seal is snug fit in the orifice.

2. The portable electronic device of claim 1, wherein the first portion of the seal has a first flex sealing surface and the second portion of the seal has a second flex sealing surface, the first flex sealing surface having structure that engages corresponding structure of the second flex sealing surface.

3. The portable electronic device of claim 2, wherein the structure of the first flex sealing surface includes a projection and the structure of the second flex sealing surface includes a recess, the projection inserts in the recess.

4. The portable electronic device of claim 3, wherein the flex circuit includes an aperture through which the projection extends to insert in the recess.

5. The portable electronic device of claim 1, wherein the seal includes an alignment projection orientated to indicate that the first portion and the second portion are flush with the flex circuit.

6. The portable electronic device of claim 1, the first portion and the second portion of the seal include at least a portion of a collar through which a fastening member inserts to fasten the first the first portion and the second portion of the seal to the housing.

7. The portable electronic device of claim 1, wherein the first portion and the second portion of the seal provide an insertion member orientated for insertion into the housing orifice, the insertion member having a beveled edge.

8. The portable electronic device of claim 7, wherein the beveled edge includes a raised ledge.

9. The portable electronic device of claim 1, further comprising an adhesive located between the seal and the flex circuit.

10. The portable electronic device of claim 1, further comprising a cover coupled to the housing, wherein the cover compresses the seal against the flex circuit.

11. A seal for a portable electronic device housing having an orifice through which a flex circuit protrudes, the seal comprising:
a first portion with a first flex sealing surface;
a second portion with a second flex sealing surface;
wherein the first flex sealing surface has structure that engages corresponding structure of the second flex sealing surface; and
wherein the first portion and the second portion engage each other with the flex circuit sandwiched therebetween.

12. The seal of claim 11, wherein the structure of the first flex sealing surface includes a projection and the structure of the second flex sealing surface includes a recess, the projection inserts in the recess.

13. The seal of claim 11, wherein the seal includes an alignment projection orientated to indicate that the first portion and the second portion are flush with the flex circuit.

14. The seal of claim 11, the first portion and the second portion of the seal include at least a portion of a collar through which a fastening member inserts to fasten the first the first portion and the second portion of the seal to the housing.

15. The seal of claim 11, wherein the first portion and the second portion of the seal provide a insertion member orientated for insertion into a housing orifice, the insertion member having a beveled edge.

16. The seal of claim 15, wherein the beveled edge includes a raised ledge.

17. The seal of claim 11, further comprising an adhesive located between the seal and the flex circuit.

18. The seal of claim 11, wherein the first portion and the second portion are flexible.

* * * * *